United States Patent (10) Patent No.: US 7,418,197 B2
Didow et al. (45) Date of Patent: Aug. 26, 2008

(54) BACK LIGHT SCREEN FOR CHROMA-KEY PHOTOGRAPHY (75) Inventors: G. Richard Didow, Tomball, TX (US); Robert Bryant, Jr., Houston, TX (US)

(73) Assignee: Alpha Photography Inc., Houston, TX (US)

( * ) Notice: Subject to any disclaimer, the term of this patent is extended or adjusted under 35 U.S.C. 154(b) by 501 days.

(21) Appl. No.: 11/002,532

(22) Filed: Dec. 1, 2004

(65) Prior Publication Data
US 2006/0114356 A1 Jun. 1, 2006

(51) Int. Cl.
*G03B 15/00* (2006.01)
(52) U.S. Cl. .......................................... 396/3
(58) Field of Classification Search ...................... 396/1, 396/3, 4; 362/3, 16
See application file for complete search history.

(56) References Cited

U.S. PATENT DOCUMENTS 3,643,085 A * 2/1972 Durand ......................... 362/97
5,897,413 A 4/1999 Erland
5,953,542 A * 9/1999 Fleming ......................... 396/3
6,211,941 B1 4/2001 Erland
6,411,778 B1 * 6/2002 Peterson ......................... 396/1
6,674,485 B2 1/2004 Akiyama et al.

FOREIGN PATENT DOCUMENTS

JP 11-194410 A * 7/1999

* cited by examiner

*Primary Examiner*—W. B. Perkey
(74) *Attorney, Agent, or Firm*—David McEwing (57) ABSTRACT A chromo-key screen method and device having a screen component with a front surface and a back surface and capable of transfusing light or other electromagnetic energy from the back surface to the front surface and one or more lights or other electromagnetic energy generators transmitting energy onto the back surface that is transfused to the front surface and transmitted from the front surface into area subject of an image capturing device, e.g. photographic or digital camera. The invention applies to chroma-key photography wherein the background screen is lighted, at least in part, from a source behind the screen. The device may include an enclosure to restrict color spilling into the foreground.

34 Claims, 10 Drawing Sheets

BACK LIGHT SCREEN FOR CHROMA-KEY PHOTOGRAPHY

BACKGROUND OF THE INVENTION

1. Field of Use

This invention relates to a background screen device in color difference image composite photography or "chroma-key" still or motion photography. The invention may be used with traditional silver halide photographic imagery or with electronic digital photography. The invention also relates to a method of lighting a background screen to minimize shadows and to compress the space between the foreground photo subject and background screen.

2. Related Art

Chroma-key and "color difference", "green screen" or "blue screen" photography are known. One limitation has been the difficulty of removing or subtracting of the background or background color from the foreground image when the background is non-uniform. The variation of the background may be caused by uneven lighting or shadows. Another problem has been "color spilling". Another limitation has been the amount of space and cost of lighting required to achieve a sufficiently uniform background or maintain the background due to movement of the photo subjects or changes in other light sources. Several methods or devices have been used in efforts to overcome these limitations. For example U.S. Pat. Nos. 5,897,413 and 6,211,941 (Erland) teach use of a bi-axially stretchable fabric of synthetic fibers treated with a dye. The technique utilizes the photochemical properties of light to actinically energize the treated fibers for improved illumination of the background screen surface. Other methods have attempted to alter the placement of lights or light reflective surfaces.

U.S. Pat. No. 6,674,485 (Akiyama) assigned to Hitachi Software Engineering Inc., describes the chroma-keying as an image compositing method wherein a picture is taken of a subject, compositing a foreground (subject) image of the picture with a background image and printing out the combined or composite image. The method comprises the steps of: extracting the foreground image from the background; memorizing saturation, brightness and hue distribution of the background image; and correcting saturation, brightness and hue distribution of the foreground image with respect to the saturation, brightness and hue distribution of the background image.

Further chromo-keying requires a blue or green screen (or other color screen as will be appreciated by persons skilled in the art) behind the foreground (photo subject) that is substantially uniform, featureless and without shadow. This requires a number of multi-directional light sources behind the subject to prevent the shadow of the subject from casting on the background screen. Accordingly chroma-keying requires considerable cost and sufficiently large space to practice due to the exacting lighting requirements needed to maintain a uniform and featureless background behind the photo subject. This has limited the applicability or utility of the method.

Frequently, the background is a colored screen is made from a woven fabric. This is an ideal material due to it being lightweight, foldable and having the ability to be cut in a variety of sizes and shapes. It also provides a good support or substrate for color coating, printing or paintings. The Hitachi invention utilizes a small and rigid LED type lighted screen behind the photo subject while the subject stands or sits in a small booth like compartment that is shielded from outside light sources. The background screen is therefore limited in size and shape and is not collapsible or lightweight.

SUMMARY OF INVENTION

The method and device subject of the present invention includes chromo-key screen having screen component with a front surface and a back surface and capable of transfusing light or other electromagnetic energy from the back surface to the front surface; and one or more lights or other electromagnetic energy generators transmitting energy onto the back surface that is transfused to the front surface and transmitted from the front surface into area subject of an image capturing device, e.g. photographic or digital camera. The invention applies to chroma-key photography wherein the background screen is lighted, at least in part, from a source behind the screen.

SUMMARY OF DRAWINGS

The accompanying drawings, which are incorporated in and constitute a part of the specification, illustrate preferred embodiments of the invention. These drawings, together with the general description of the invention given above and the detailed description of the preferred embodiments given below, serve to explain the principles of the invention.

FIGS. 8A and 8B illustrates the relationship of the back-light screen to other chroma-key components.

FIG. 9 is another illustration of the back-light screen subject of the invention, the foreground area and floor and other chroma-key components.

DETAILED DESCRIPTION OF THE INVENTION

The above general description and the following detailed description are merely illustrative of the subject invention and additional modes, advantages and particulars of this invention will be readily suggested to those skilled in the art without departing from the spirit and scope of the invention.

Chroma-key photography includes the step of distinguishing the background from the foreground, typically by use of differing colors. The step often utilizes a strong vibrant colored background, e.g. a blue screen or green color. At some point, the distinct color difference between the background and foreground is used to remove or separate the foreground from the background. In one variation, the color components of the background are removed from the entire photo image. Since the foreground contains little of the background color component, there is little or no loss in the foreground image. In digital photography, the separation of background from foreground can be accomplished by subtracting the value of background color from each pixel of the image. This can be accomplished by several methods, including computer software.

It is a general object of this invention is to provide an apparatus that can be used in color difference or chroma-key photography (hereinafter "chroma-key"). Specifically, the apparatus is a back-lighted or rear lighted surface that provides or displays a substantially uniform background color that can be distinguished and subtracted out of the photo image. Frequently, the background is replaced with a separate image thereby achieving a composite photo.

The present invention combines the flexibility and portability of woven fabric background material with other materials and components to reduce the space and lighting requirements for uniform lighting of the background, reduction of color spilling and avoidance of optical illusions or Moire effect (hereinafter "noise pattern").

It will be appreciated that the photo subject is positioned in front, i.e., foreground, of the back-lighted surface, such back-lighted surface displaying a uniform colored background, the color components of which are recognizable and can be removed from the image without unsatisfactory degradation of the foreground image. The recognition and removal of the background color can be performed by CPU controlled software and equipment.

In an embodiment of the invention, the back-lighted screen includes a non woven material such as a foam or other material that does not contain a repetitive grid or parallel line pattern (such as the line patterns created by a fabric weave and possible pattern of light refraction) and through which light can be transmitted or transfused. Light passing through the screen does therefore not create a Moire effect or noise pattern seen by the image capturing device or camera. A light source can be placed behind the screen. The back-lighted screen allows the foreground subject or photo subject to be positioned closer to the screen. The foreground subject can therefore be the principal object, e.g., light quantity and quality, of the lighting in front of the background screen. Concern with shadow can be reduced since the background is now providing its own light source. In other embodiments, there can be a translucent and light-diffusing coating placed on a woven (or non woven) fabric. The coating or covering subcomponent may contain actinic properties. The fabric may also be translucent.

Prior to the subject invention, the photo object was required to be approximately 5 to 6 feet in front of the background screen. In the present invention, the photo subject can be approximately 1 foot in front of the screen. Since the lighted area is thereby significantly reduced, there is a resulting increase efficiency of space and energy.

In the preferred embodiment of the present invention, the background screen is configured as an outer surface of a substantially enclosed structure. The structure may include the lighting mechanism or source. The lighting source within the enclosure can enhance the efficiency of light energy shining upon or directed to ("transmitted") to the back surface of the screen. As will be appreciated by persons skilled in the art, a portion of the light is transfused or conveyed through the screen. The other surfaces of the structure can be reflective, thus allowing light to be transmitted to the screen back surface multiple times. The screen may be of either a transparent or translucent material. The screen can be coated with a component that colors or diffuses the light. The coating may be on either or both sides of the screen. A portion of the light is then transmitted out from the front surface of the screen (which may be a coated diffusing or coloring surface) into the foreground area where the photo subject may be located.

As will be appreciated by persons skilled in the art, the screen material can be selected from translucent material, i.e., allowing the penetration of light through the material while sufficiently diffusing the transfused light so that no image from the back of the screen is visible. The screen material may contain color absorptive components such that the light energy transmitted from the front surface into the foreground is a suitable or selected range of wavelengths. Although a woven fabric has often been used as a screen material, efforts to provide backlighting through the woven fabric have had undesired results. Transmitting light through the back of a fabric screen has not satisfactorily reduced color spilling. It has also has created undesired "noise" or non uniformity in the background seen by the camera. It is likely that light transmitted through the woven fibers creates a Moire effect, i.e., an optical illusion that occurs when many parallel lines are placed near each other or there is a repetitive grid pattern within the material. Such repetitive grid may be created by the fiber weave pattern of the woven fabric.

It will be further appreciated that the energy may be of other electromagnetic energy outside the visible light spectrum. It will also be appreciated that varying the wavelength of an energy source may alter the refraction of the energy through the material.

Figure 1:
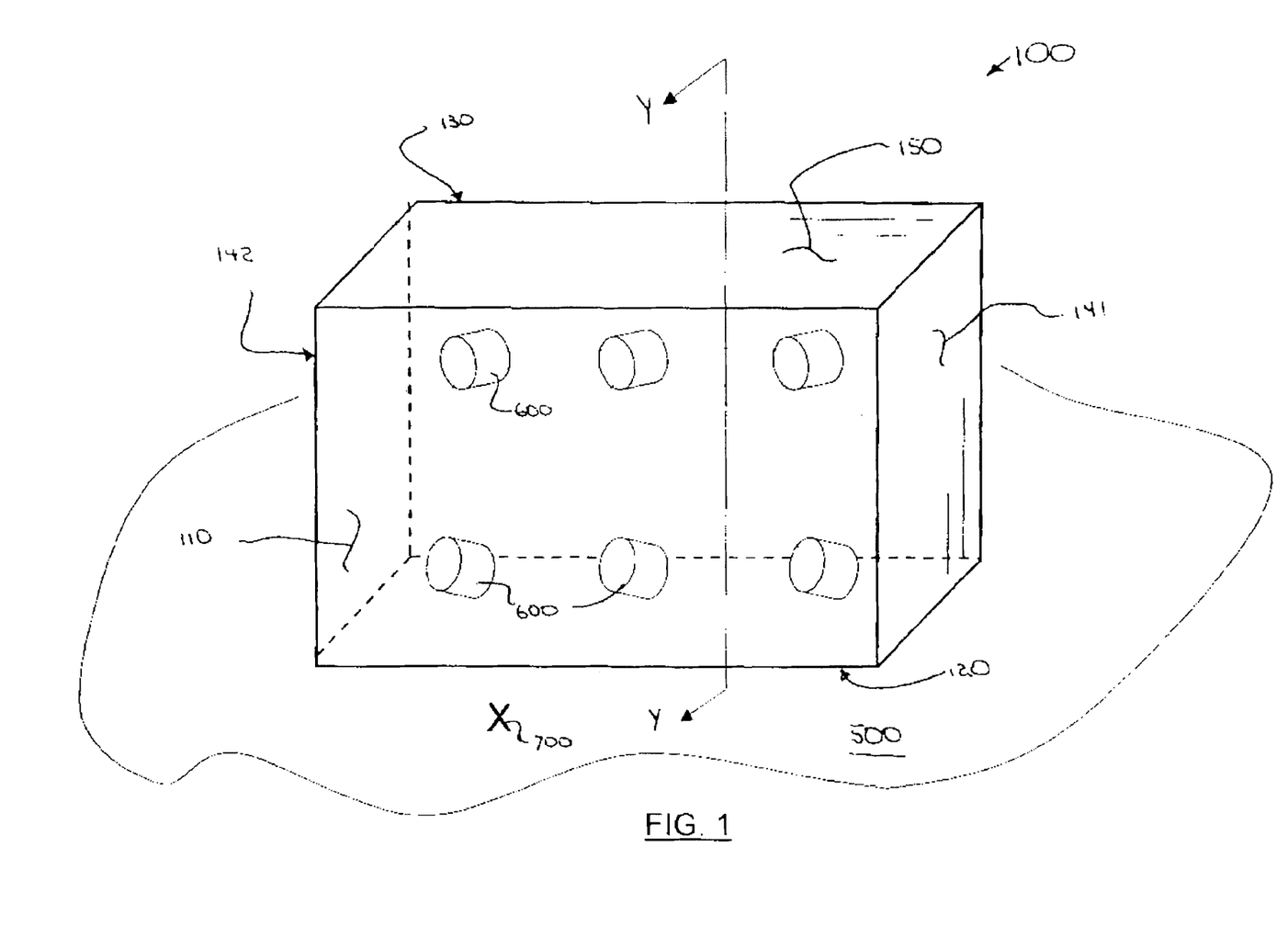
FIG. 1 illustrates a perspective view of the preferred embodiment of the invention wherein the lighting source is contained within an enclosed structure that includes the back-lighted screen.

FIG. 1 illustrates a perspective view of a simple example of a "six-sided" structure 100 of a preferred embodiment, containing a back-lighted screen surface 110. Another side 120 may comprise the floor surface 500. The structure may have a back-side 130, two side panels 141, 142 and a top panel 150. It will be appreciated that the surface of the back-lighted screen 110 within the interior of the rectangular structure 100 comprises the back side of the chromo-keyed screen. The large "X" 700 shown on the floor surface 500 approximates the fore ground in front of the back lighted or chromo-keyed screen. Also illustrated within the structure are 6 lights 600 that shine light upon the back surface of the screen 110 It will be appreciated that the invention is not limited to the number, type or configuration of the light sources.

The invention in further not limited to the use of an enclosed structure. The screen is also not required to be a planar surface and may be a concave or other complex shape. Such complex shape may enhance the 3 dimensional effect of the final composite chroma-key image.

Figure 2:
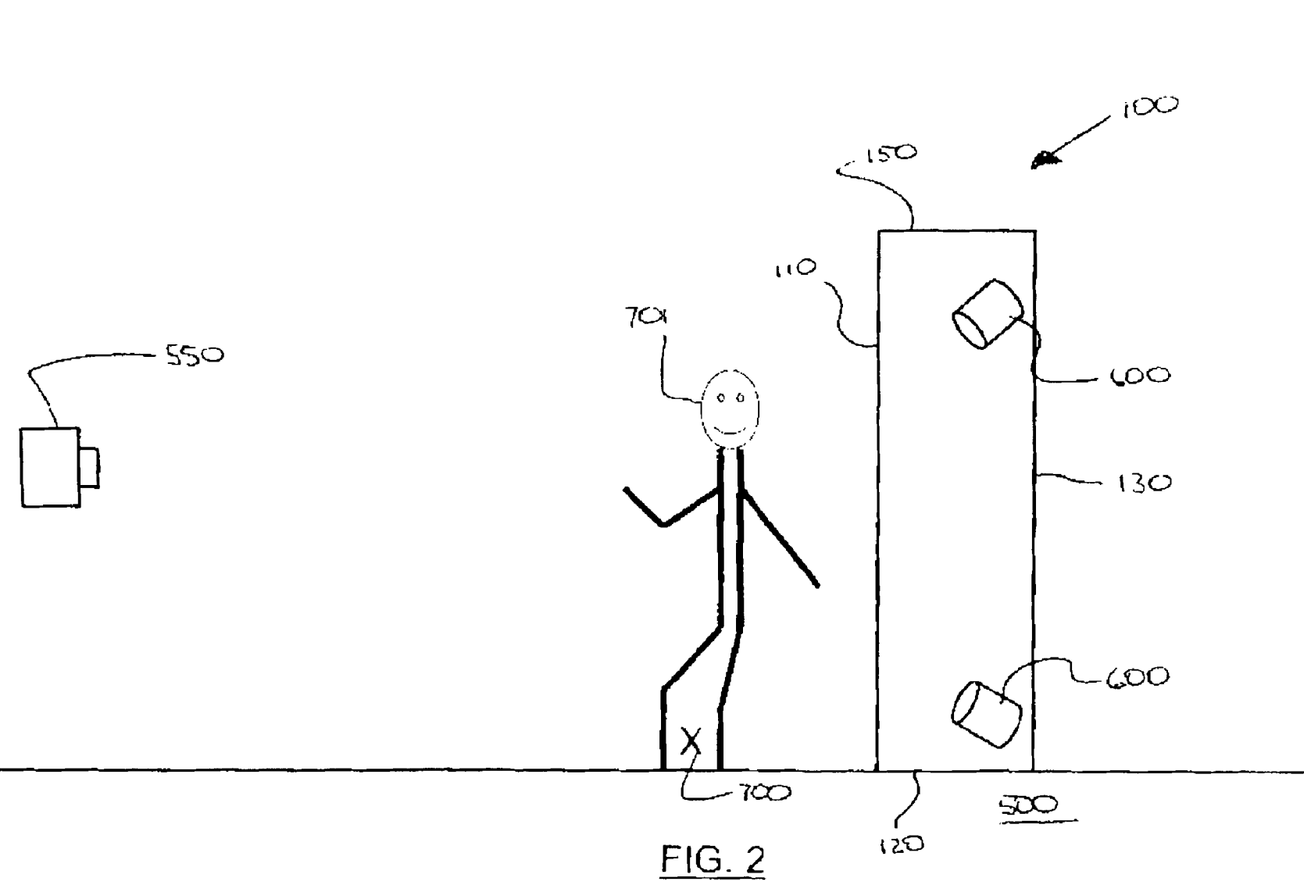
FIG. 2 illustrates a cross sectional view of the enclosure structure along the axis shown in FIG. 1, including the lighting source, screen, as well as the foreground, subject and camera.

FIG. 2 illustrates a cross sectional view of the screen structure along the axis YY illustrated in FIG. 1. Illustrated are the lighting devices 600 within the enclosure 100, an enclosure top 150, enclosure back 130, the floor 500 forming the bottom 120. Also illustrated is the back screen 110. It will be appreciated that the back screen is the front side of the enclosure 100 relative to the foreground area illustrated by the "X" 700. A photo subject 701 is illustrated standing in the foreground, between the camera 550 (or other image capturing device) and the back screen 110.

It will be appreciated that the use of the enclosure structure illustrated in FIGS. 1 and 2 will limit the amount of light or color "spilling" into the foreground from the back screen lighting devices. It will be appreciated that the lighting devices may emit a selected color or contain a portion of the color spectrum that is to be subtracted from the photo image and which may be spilling onto the photo subject in the foreground. It will be appreciated that it is desired that the uniform, featureless screen is to be of a color that is not a significant component of the photo subject. Therefore, it is undesirable for the light from the screen lighting (or other electromagnetic energy) to spill on to the photo subject, i.e., color spilling.

Figure 2A:
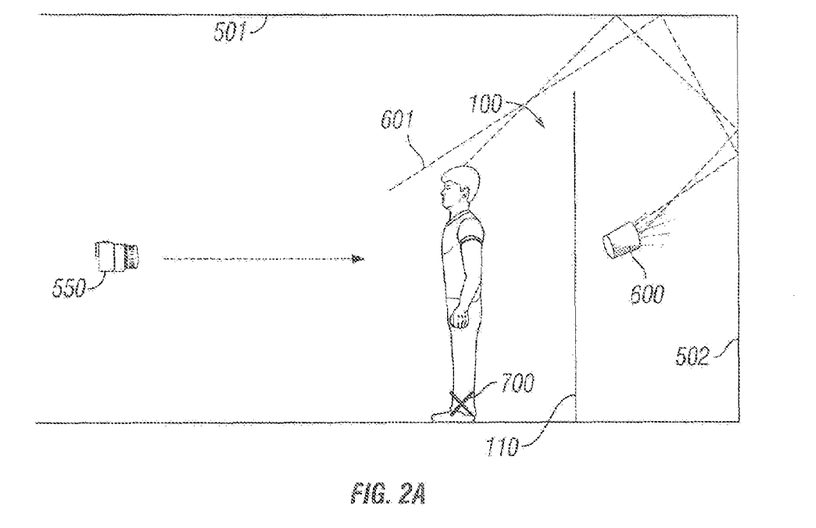
FIGS. 2A and 2B illustrate the color spilling and the minimization of color spilling as taught by an embodiment of the present invention.
Figure 2B:
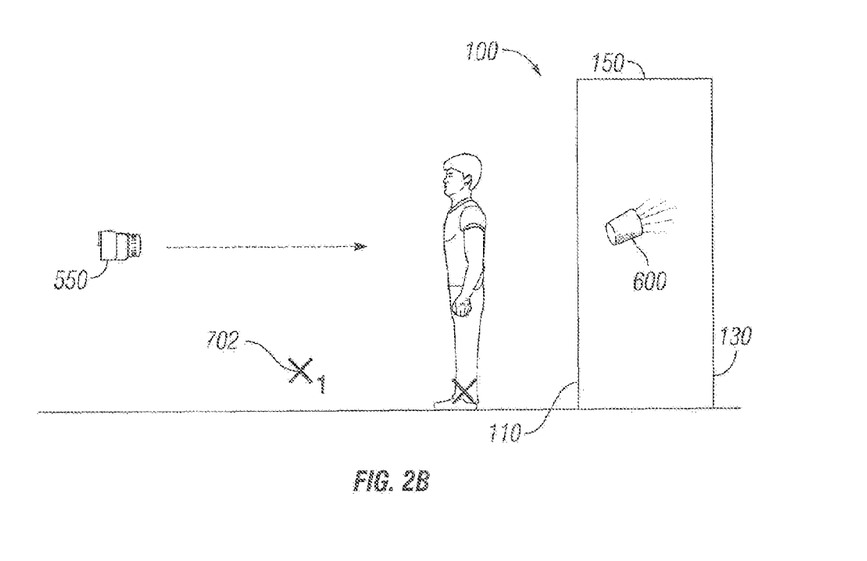

The undesired spilling light is illustrated by comparison of FIGS. 2A and 2B. In FIG. 2A, light 601 from light sources 600 is transmitted to the back of the screen 110 and transfused 603 through the screen into the foreground 700. However a portion of the light is reflected from other surfaces such as a ceiling 501 and walls 502, thereby causing portion of light to by pass the screen 110 and spill onto the photo subject 701 standing in the foreground X 700 and beyond $X_1$ 702. This additional light will be seen by the image capturing device 550, e.g., the camera, on the image of the foreground subject 701.

In contrast, FIG. 2B illustrates the light 601 emitted from the light sources 600 remaining within the structure 100, excepting the portion transmitted onto the back surface of the screen 110 and transfused through and transmitted 603 into the foreground X 700. The transmitted light 603 does not spill onto the photo subject 701. The light is more efficiently used. The background color components can also be more effectively removed from photo without impacting the image in the foreground. The interior surfaces of the top 150, back 130, sides (not shown) and bottom 120 maybe light reflective.

Figure 3:
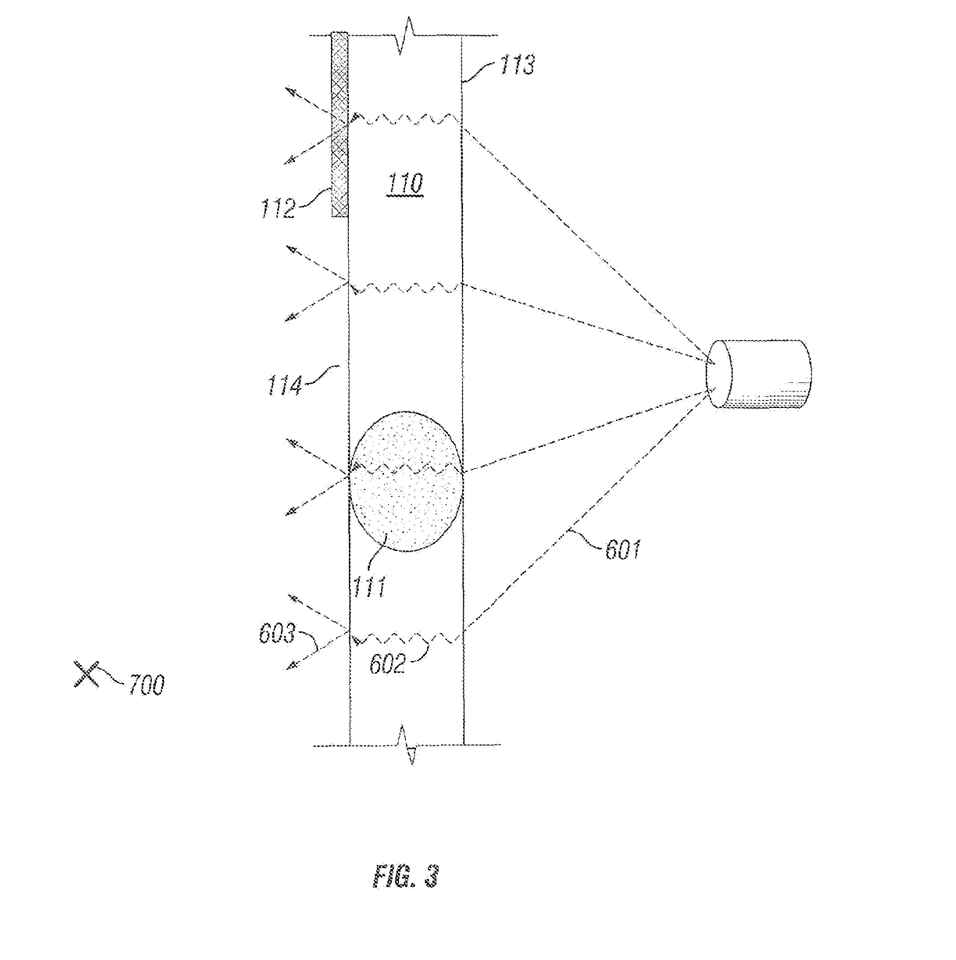
FIG. 3 illustrates the screen material in relation to the light source, the transmission of light on to the back surface of the screen, the transfusion or diffusion of light through the screen material and the transmission of light from the front surface into the foreground.

FIG. 3 illustrates an expanded cross sectional view of the screen material 110, having a front surface 114 and back surface 113. The light source 600 and foreground 700 are also illustrated. The light 601 (or other electromagnetic energy) is transmitted or radiated from the light source 600 (or other electromagnetic energy source) to the back surface 113 of the screen 110 material. At least some portion of the light 602 (or other electromagnetic energy) is diffused or transfused through the screen material to the front surface 114 where again, at least some portion 603 is transmitted into the foreground 700. The material may contain a component 111 or 112 that absorbs all colors other than that portion of the color spectrum to be transmitted into the foreground. This function may be performed by a coating 112 on either the front surface 114 or back surface of the screen material. The coating may be on both sides and be used with an absorptive component 111 within the material. Alternatively, the coating or component may reflect all portions of the color spectrum except the desired portion to be transmitted into the foreground. The invention may also include an optional film or gel screen or filter 640 used in conjunction with the light source 600. This screen ("filter") may filter the color (wavelength) of the emitted light or electromagnetic energy. The filter may optionally be varied in conjunction with changes in the foreground lighting caused by extraneous light, such as sunlight.

In another embodiment of the invention, the screen material may contain a coating of a dye formulation including fluorescence which is photo-chemically reactive (actinic) to an energy source such as a spectra of electromagnetic radiation, including visible light, to achieve a spectral emission of a desired color and luminance for providing a desired stimulus to an image recording medium, e.g. a still or motion camera. It will be appreciated by persons skilled in the art that there are multiple commercially available dyes or coatings that may provide suitable illumination. Some of these dyes are disclosed in U.S. Pat. Nos. 5,893,413 and 6,211,941 (Erland). This coating may facilitate uniform transmission of the desired light from the background surface, thereby minimizing "bright spots".

In the preferred embodiment, the back light screen material 110 is comprised of a foam material 111. The foam material may be an open cell foam such as Chromakey Green Veltex, manufactured by Velcro Industries B.V. Corporation Netherlands. (Veltex and Velcro are registered trademarks of Velcro Industries.) The front surface 114 may be additionally coated 112 with a commercially available coatings known to persons skilled in the technology.

Referring again to FIG. 1, it will be appreciated that the surfaces of the top 150, bottom 120, sides 140 and back 130 of the enclosure may be coated or made of a material that reflects the light from the lighting devices 600. In another embodiment (not shown), the components of the structure or other components may absorb the light or the portion of the light spectrum emitted or transmitted from the back screen material. These can be outer subcomponent layers.

Figure 4:
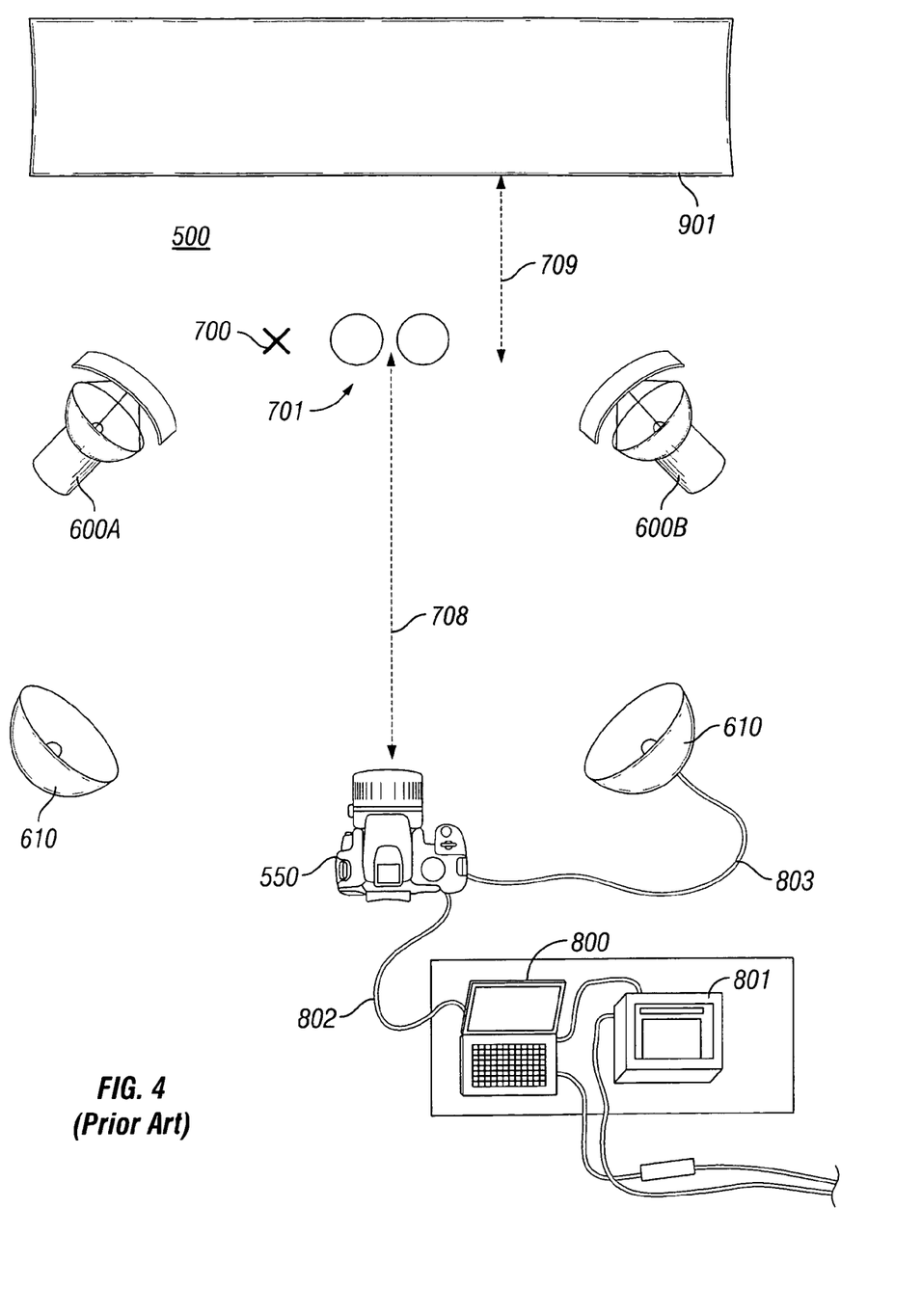
FIG. 4 illustrates the prior art relationship of the photo subject, foreground, lighting and background screen.

FIG. 4 illustrates a prior art arrangement utilizing at least two sets of lights 600A and 610 positioned in front of the background screen 901. The photo subjects 701 are in the foreground 700 and, in this case, standing on the floor 500. The photo subjects are approximately 5 feet 709 in front of the background. The camera 550 is approximately 6 to 8 feet 708 in front of the objects. The total space between the camera and the background is in excess of 10 feet. One set of lights 610 is used to light the foreground area 700. A separate set of lights 600A-600B is used to light the background. It will be appreciated that without this second set of lights 600A-600B, the photo subjects standing between the first light set 610 and the background will cast shadows on the background, thereby creating a non-uniform background image to the camera 550.

FIG. 4 also illustrates the invention as used in conjunction with ancillary equipment for one type of chroma-key photography. Illustrated are the CPU 800, photo printer 801, electric communication wire between the camera and CPU and a flash synchronization lighting cable to at least one set of lights 610.

Figure 5:
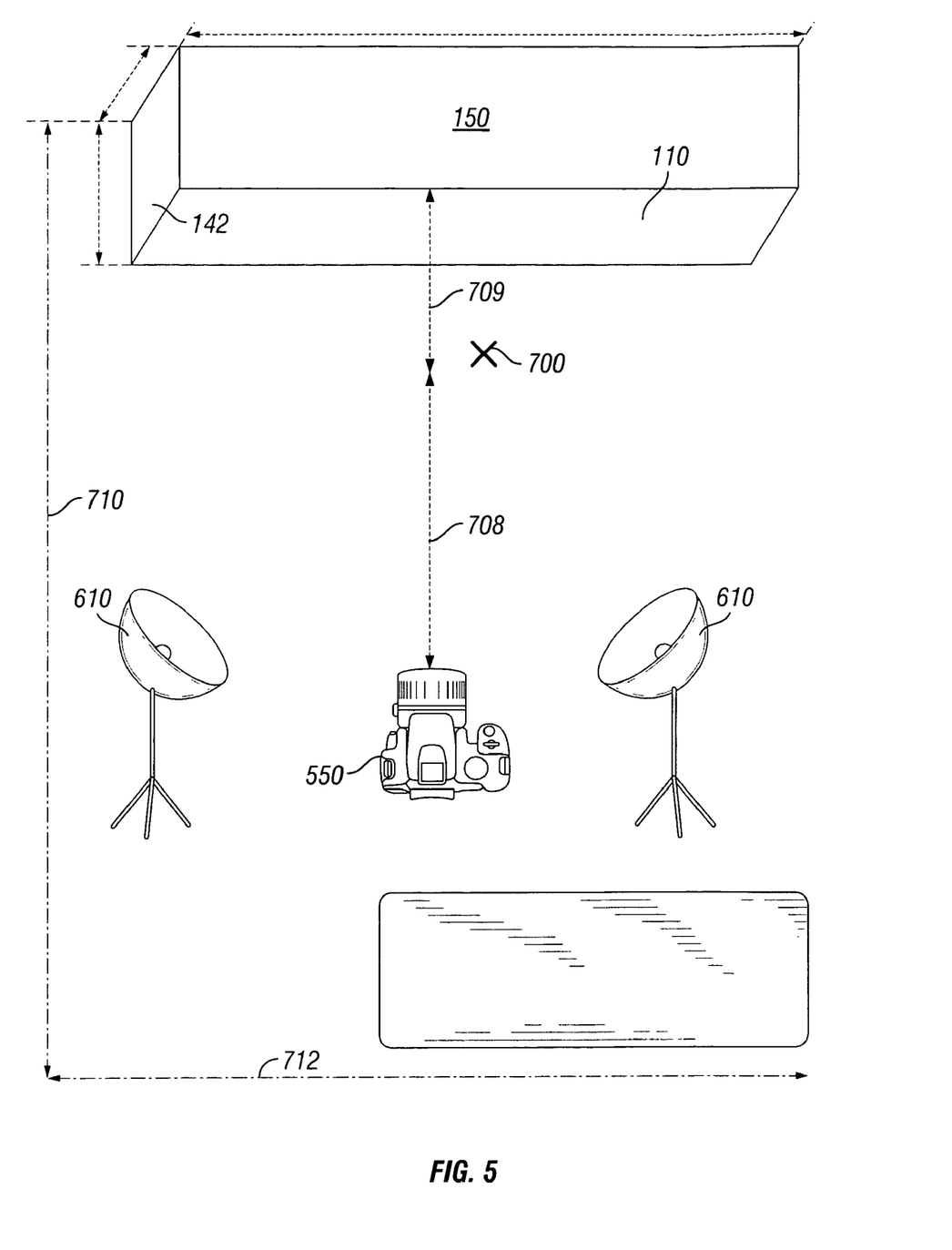
FIG. 5 illustrates the relationship of the photo subject, foreground, lighting and background screen as taught by the present invention.

FIG. 5 illustrates the preferred embodiment of the present inventions wherein a single set of lights 610 is between the camera, the foreground "X" and the back-lighted screen 110. It will be appreciated that the structure 100 contains light sources (not shown). The distance between the camera 550 and photo subjects (not shown) can now be reduced to approximately 5 feet, thereby creating greater flexibility, i.e., the photo subject can stand within one foot 709 in front of the background 110 with the camera being 5 feet 708 from the subject. The total area occupied, including ancillary equipment, is approximately 10 ft by 8 ft.

It will be appreciated that the screen material and/or enclosure may be held by a support structure. The support structure can be comprised of attachable/detachable components and subcomponent that are relatively small and lightweight. The screen material, in the preferred embodiment, is also a light weight and foldable or compressible material. The support structure holds the background screen, lighting device(s) back, side, top or bottom enclosure panels. In the preferred embodiment, the support components are comprised of subcomponents that can be assembled and un-assembled and are comprised of a plurality of smaller subcomponents. The "collapsible" nature of the enclosure, screen and supports facilitates the flexible use of the device and storage and transportability of the device.

Figure 6:
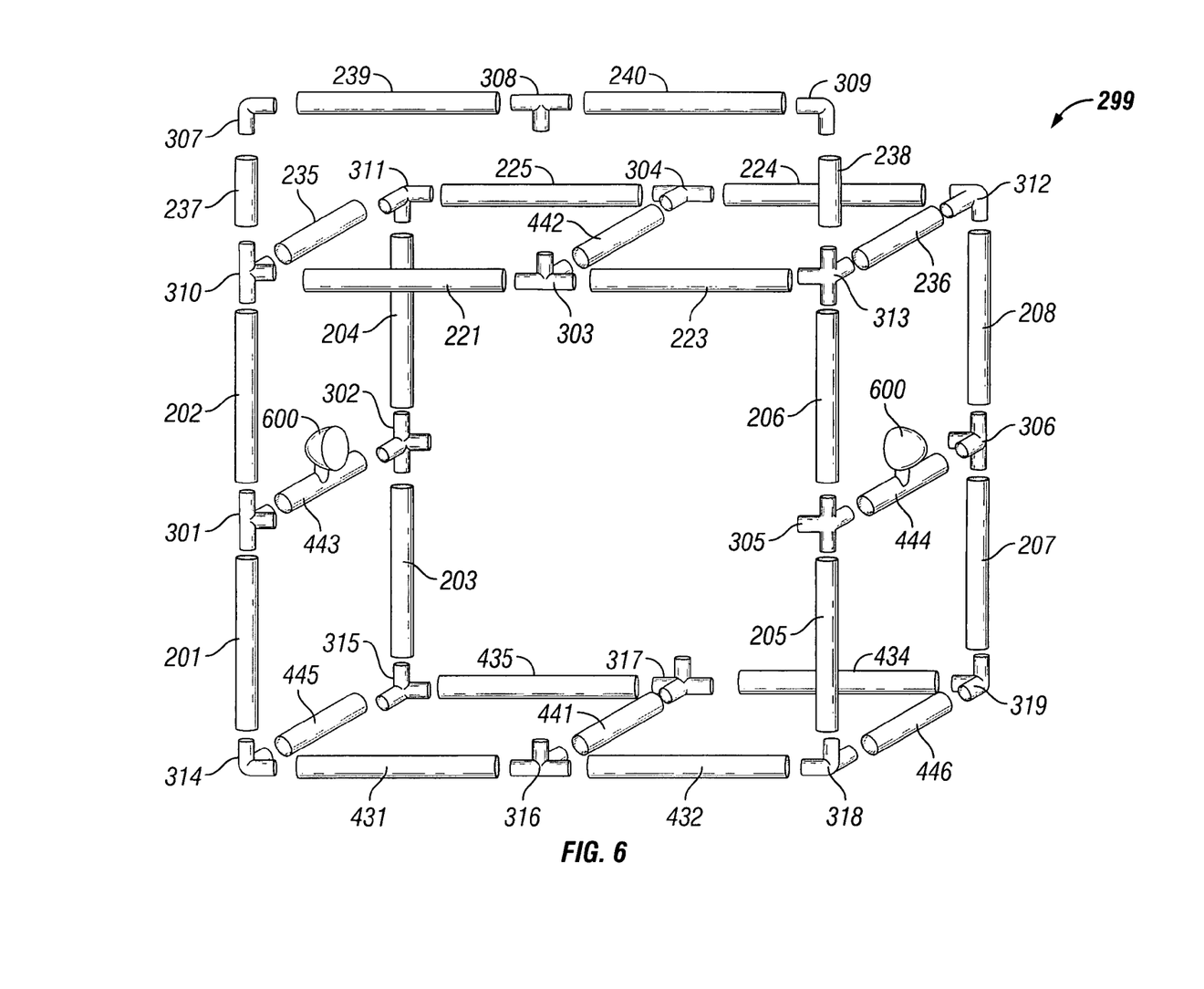
FIG. 6 illustrates the assembly of support components for the structure containing a back-lighted screen.

FIG. 6 illustrates a variation of the present invention currently used in the preferred embodiment. The back lighted screen (not shown) is typically 8 ft high and 8 ft wide. The back lighted screen, enclosure sides, back and top are supported by a support frame 299 that is comprised of a plurality of support components. The back lighted screen is held by a set of support components 201, 202, 205, 206, 221, 223 that are each approximately 4 ft in length and have a Velcro (hook or loop) covering (not shown) compatible with a counter part (hook or loop) material on the edge of the screen material. The bottom support structure 431, 432 is also of two 4 ft sections that are not covered with Velcro mechanism for attachment to the screen. The support structure also has a counter part back frame comprised of subcomponents 203, 204, 207, 208, 224, & 225. These subcomponents are also Velcro covered and to which the back enclosure surface (not shown) is attached. The back frame is attached to the front support frame at the two top corners by Velcro covered subcomponents 235, 236 that are approximately 2 ft in length. A side panel (not shown) is attached with Velcro to a top subcomponent 235 or 236 and a set of side subcomponents 201, 202, 203, 204 or 205, 206, 207, 208, each forming the two end sides.

In the preferred embodiment as now practiced, a 2 ft space of the structure 299 screen back surface and the enclosure back side has been found to be adequate for the uniform lighting of the back surface of the background screen (not shown) by one or more light sources 600 such as Photo moonlights of at least 250 Watt Seconds. It will be appreciated that if the screen subject of the invention is used in conjunction with motion photography, a continuous light source would be used. In the preferred embodiment, the front and back support structures are also joined by additional subcomponents at the bottom corners 445, 446 and at each mid point 441, 442, 443, 444. It has been found unnecessary to use Velcro attaching materials on these subcomponents. The lighting devices can also be attached to the support components and in the preferred embodiment, the mid point side subcomponents 443, 444 are used. In the preferred embodiment a plurality of 3 pronged 301, 302, 304, 305, 306, 311, 312, 316, 317, 318, 319 and 4-pronged 303, 310, 313 male subcomponent are used to fit into and attach together the support components. In the preferred embodiment illustrated in FIG. 6 similar subcomponents 237, 307, 239, 308, 240, 309, 238 are used to attach a sign or similar device (not shown). In the preferred embodiment, the front and back support structures are also joined by additional subcomponents at the bottom corners 445 446 and at each mid point 441, 442, 443, 444. It has been found unnecessary to use Velcro attaching materials on these subcomponents. The lighting devices can also be attached to the support components and in the preferred embodiment, the mid point side subcomponents 443, 444 are used. In the preferred embodiment a plurality of 3 and 4-pronged male subcomponent are used to fit into and attach together the support components. In the preferred embodiment illustrated in FIG. 6 similar subcomponents 237, 307, 239, 308, 240, 309, 238 are used to attach a sign or similar device (not shown).

Figure 7A:
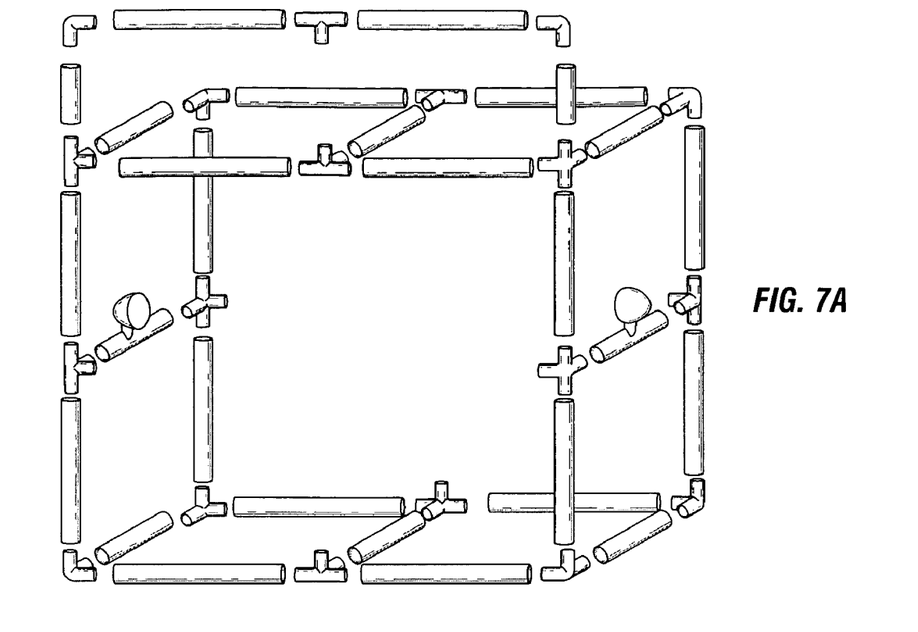
FIG. 7A, 7B, 7C, 7D, 7E illustrates the relationship and possible sequential installation of the support components and the enclosure structure components.
Figure 7B:
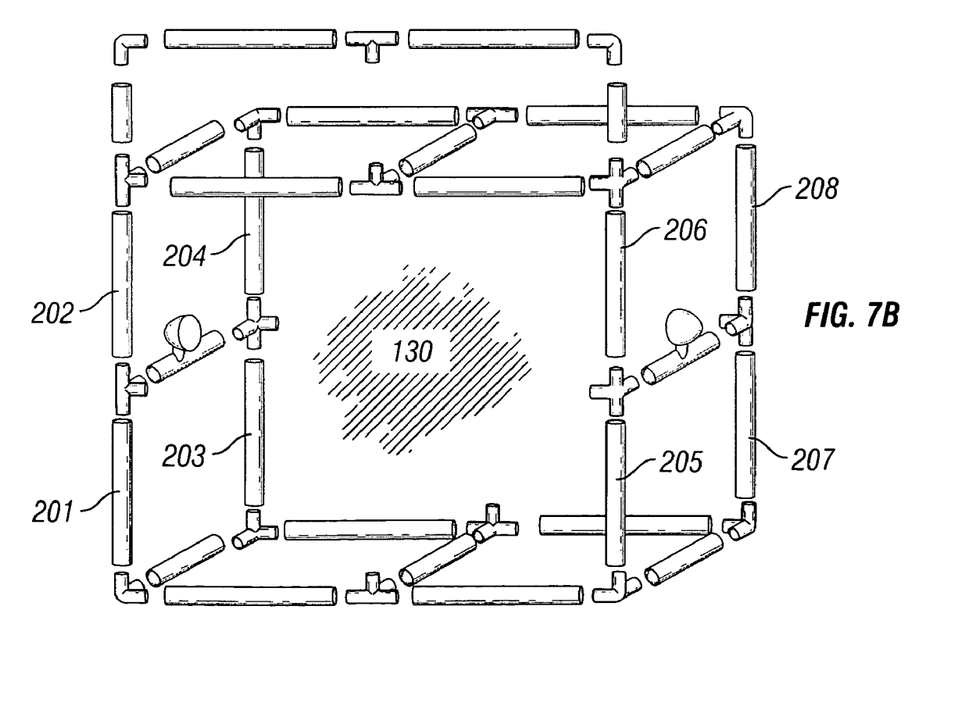
Figure 7C:
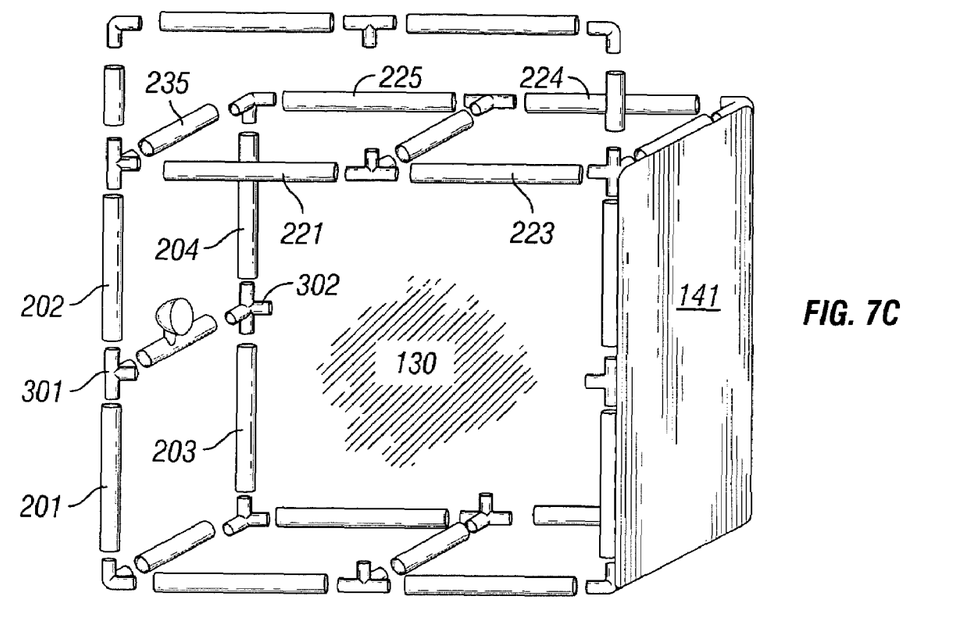
Figure 7D:
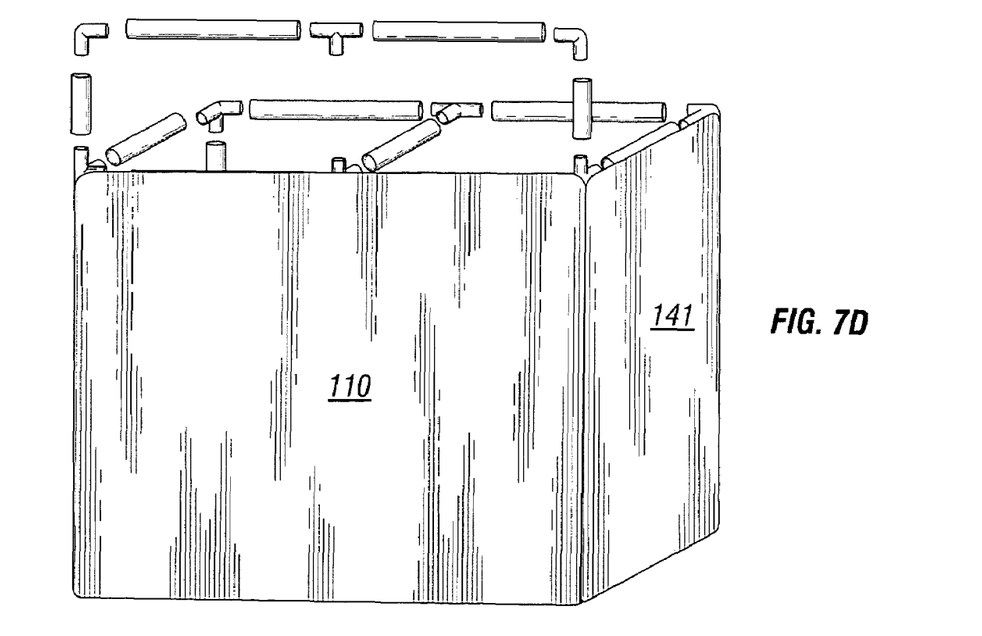
Figure 7E:
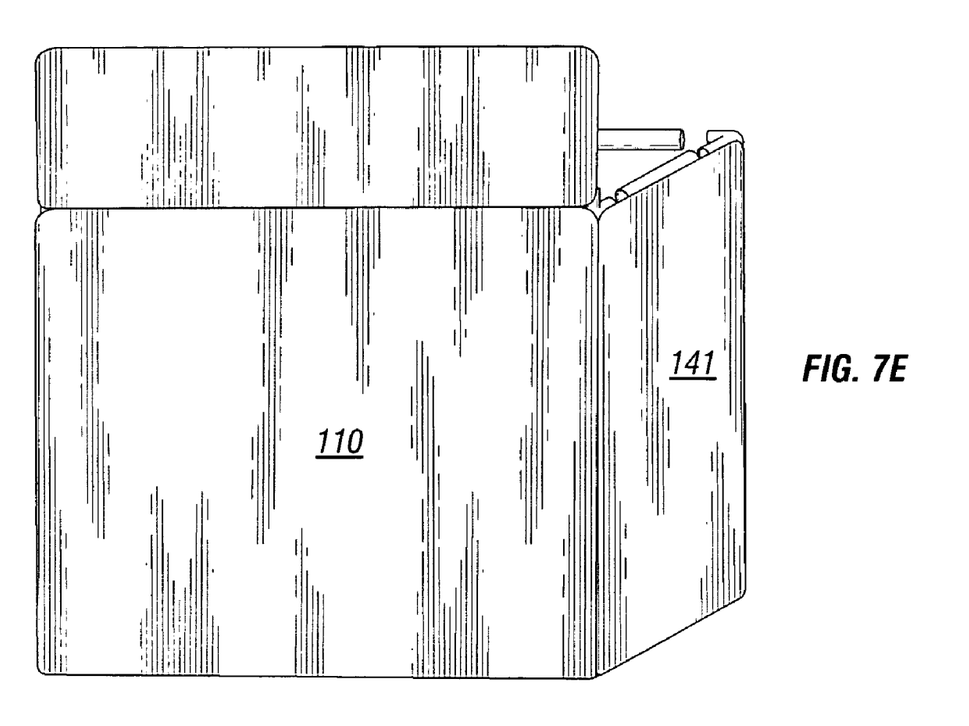

FIGS. 7A and 7B illustrates the subcomponents forming the support structure component 299 and a sequential addition of the back enclosure surface 130. The subcomponent of the support structure have the same identifiers as used in the detailed illustration of FIG. 6. FIGS. 7C, 7D and 7E continue the sequential installation of the enclosure sides 141 and the back-lighted screen 110 thereby forming the enclosure structure 100.

FIG. 7C illustrates the support structure component 299 with one side enclosure component 141 attached. FIG. 7D illustrates the addition of the background screen 110 to the structure 299 and FIG. 7E illustrates the completed structure 100, including the optional sign. The support structure may also hold lighting device(s), in addition to holding the back-lighted screen and back, top and side enclosure panels. In the preferred embodiment, the support components are comprised of subcomponents that can be assembled and un-assembled and are comprised of a plurality of smaller subcomponents. The "collapsible" nature of the enclosure, screen and supports facilitates the flexible use of the device and storage and transportability of the device.

While specific embodiments have been illustrated and described, numerous modification are possible without departing from the spirit of the invention, as the scope of protection is only limited by the scope of the accompany claims.

This specification is to be construed as illustrative only and is for the purpose of teaching those skilled in the art the manner of carrying out the invention. It is to be understood that the forms of the invention herein shown and describe are to be taken as the presently preferred embodiments. As already stated, various changes may be made in the shape, size and arrangement of components or adjustments made in the steps of the method without departing from the scope of this invention. For example, equivalent elements may be substituted for those illustrated and described herein and certain features of the invention may be utilized independently of the use of other features, all as would be apparent to one skilled in the art after having the benefit of this description of the invention.

Further modifications and alternative embodiments of this invention will be apparent to those skilled in the art in view of this specification.

We claim:
1. A chromo-key screen comprising:
   a. a first chroma-key background screen comprised of non woven material mounted on a frame substantially perpendicular to a floor having a front surface and a back surface and displaying a substantially uniform featureless background color and lighting through the front surface;
   b. the frame further holding a substantially light impenetrable second back screen, third and fourth side screens and a top screen;
   c. attachment mechanism removeably attaching the screens to the frame;
   d. the frame comprises a base occupying floor space within the interior of the first front screen,
   e. and the combined screens creating an enclosed three dimensional rectangular shape where the sides, top and second back screens are substantially light impenetrable; and
   f. two or more lights transmitting light onto the second back screen, side panel screens, top screens and back surface of the first screen that is transfused to the front surface and transmitted from the front surface of the first screen and wherein each light is placed apart from the other within the enclosed screens.

2. The device of claim 1 wherein the light transmitted from the front of the first screen is tinted.

3. The device of claim 1 further comprising a second back screen, third and fourth side panel screens, and a top screen wherein each screen is attached to the frame and wherein at least one screen is coated to tint and reflect light.

4. A chromo-key screen comprising:
a. a first screen component mounted substantially perpendicular to a floor having a front surface and a back surface and capable of transfusing light from the back surface to the front surface;
b. at least two separately positioned light sources transmitting light onto the first screen back surface such that light is transfused from the back surface to the front surface and transmitted from the front surface;
c. the first screen front surface of the screen component displaying a substantially flat and uniform colored surface to an image capturing device;
d. two side screens and a top screen attached to the first screen and a second back screen attached to the side and top screens forming a substantially light impenetrable rectangular enclosure and reflecting light to the back surface of the first screen; and
e. a frame having a base within the space between the first and second screens.

5. The device of claim 4 wherein the first screen front surface color is green.

6. The device of claim 4 wherein the first screen front surface color is blue.

7. The device of claim 4 wherein at least one screen comprises a substantially a non woven material.

8. The device of claim 4 wherein at least one screen comprises a non fibrous material.

9. The device of claim 8 wherein the first screen includes a foam material.

10. The device of claim 9 wherein the foam includes open cell foam material.

11. The device of claim 9 wherein the foam includes a closed cell foam material.

12. The device of claim 4 further comprising the reflective coating of the enclosure and tinting of the reflected light.

13. The device of claim 12 further comprising a coating on the first screen front surface.

14. The device of claim 12 further comprising a coating on the first screen back surface.

15. The device of claim 12 wherein the color absorbing material is contained within the first screen.

16. The device of claim 4 further comprising a filter component proximate to the light source.

17. The device of claim 4 wherein the light source transmits a selected color.

18. The device of claim 4 wherein the light source transmits a selected spectra of electromagnetic energy.

19. The device of claim 4 wherein the light source is at least one photo moonlight of at least 250 Watt Seconds.

20. The device of claim 4 wherein the first screen includes an actinic component.

21. The device of claim 20 wherein the actinic component is a coating on at least one surface of the first screen.

22. A method of lighting a chromo-key screen comprising the steps of
a. placing a first flat chroma-key screen having a front surface and a back surface on a frame that can be assembled and disassembled and having a base within the space between the first screen and a second screens;
b. using the frame to connect the first screen to an enclosure comprising two side screens, a top screen and the second screen wherein the first screen, the two side screens and the second screen are perpendicular to a floor;
c. transmitting light from at least two separate positions within the enclosure onto the back surface of the first chroma-key screen;
d. transfusing light through the first chroma-key screen from the back surface to the front surface.

23. The method of claim 22 further comprising displaying a uniform color to an image capturing device.

24. The method of claim 22 further comprising supporting the screen with a multi-piece structure.

25. The method of claim 24 further comprising transmitting light from a plurality of light sources held by the structure in a plurality of separate positions on the structure.

26. The method of claim 22 further comprising restricting light spillage from the lighting source to the foreground utilizing substantially light impermeable side, top and second back screen enclosures.

27. The method of claim 22 further comprising supporting the screen, the light source and the enclosure with a multi-piece structure.

28. The method of claim 27 wherein the multi-piece structure can be dissembled and assembled.

29. The method of claim 27 further comprising separating the first screen back surface and the second back screen enclosure surface by approximately 2 feet to achieve enhanced distribution of light at the back of the first screen.

30. The method of claim 22 further comprising at least one enclosure surface that is light reflective.

31. The method of claim 22 further comprising transfusing light through the first screen wherein the screen further comprises a non woven screen component.

32. The method of claim 22 further comprising transmitting light to the screen back surface wherein the first screen includes an actinic component between the front and back of the screen.

33. A chromo-key screen comprising:
a) flat featureless first screen having a non-woven material component with a front surface and a back surface extending to the floor and capable of transfusing a single color of light uniformly from the back surface to the front surface and transmitting the light to a camera;
b) the screen supported by a multi-piece support structure that can be assembled and disassembled;
c) an enclosure comprising two side screens, a top screen and a second back screen wherein each screen is substantially light impenetrable and each screen is attached to the frame with hook and loop attachment components so that color spilling is minimized;
d) the second back screen is positioned 2 feet from the back of the first screen for dispersion of light within the enclosure to the back of the first screen; and
e) one or more light sources transmitting light onto the first screen back surface, the second back screen surface, the two side enclosure surface and top enclosure surface, a portion of such fight being transfused to the screen front surface and transmitted from the front surface.

34. A method of chromo-key photography comprising:
a) installing a first flat chroma-key featureless screen having a non-woven material component with a front surface and a back surface and capable of transfusing light from the back surface to the front surface;
b) transmitting light from one or more light sources onto the screen back surface, a portion of such light being transfused to the first screen front surface and transmitted from the front surface;
c) displaying a substantially uniform color from the first screen front surface;
d) supporting the screen with a multi-piece support structure that can be assembled and disassembled;

e) enclosing the light source and screen back surface with an light impenetrable enclosure to restrict color spilling and supported by the structure containing the light source and comprising
  i. a second back enclosure surface that is substantially 2 feet from the screen back surface,
  ii. two side enclosure surfaces,
  iii. a top enclosure surface,
  iv. at least one partially reflective lining; and
f) attaching at least the top and sides of the screen and enclosure to the support structure with hook and loop attachment mechanisms.

* * * * *